Oct. 28, 1952  C. A. EDMAN  2,615,942
VENTILATION AND COOLING OF HOUSEHOLD MIXERS
Filed April 17, 1951  2 SHEETS—SHEET 1
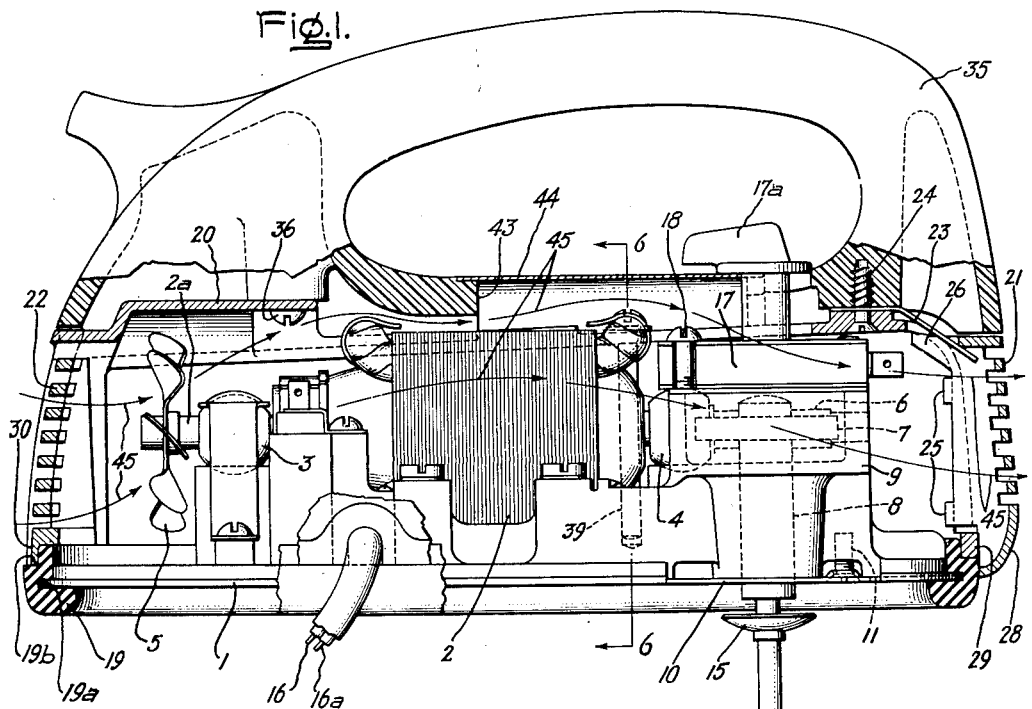
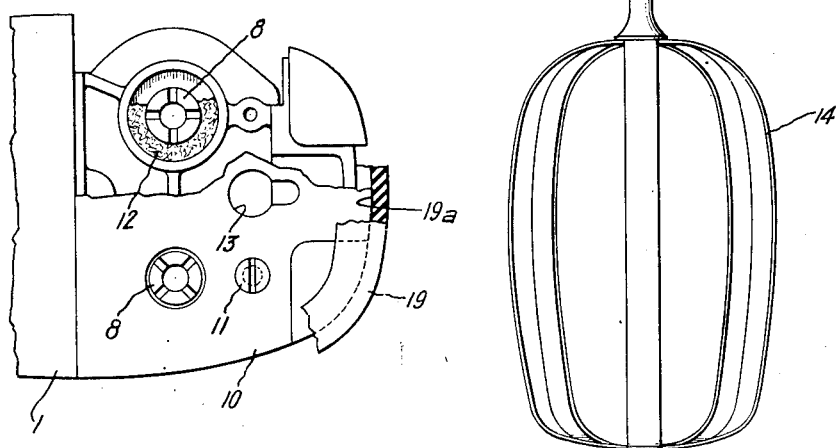
Inventor:
Carl A. Edman,
by *His Attorney.*

Oct. 28, 1952 C. A. EDMAN 2,615,942
VENTILATION AND COOLING OF HOUSEHOLD MIXERS
Filed April 17, 1951 2 SHEETS—SHEET 2
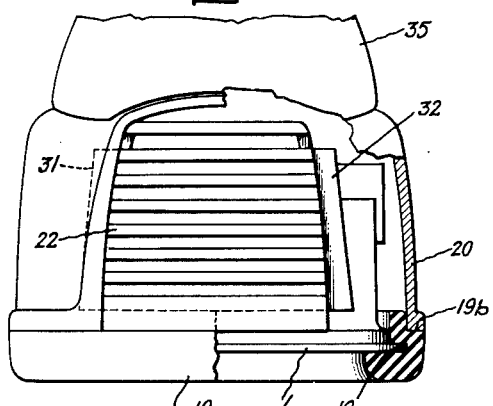
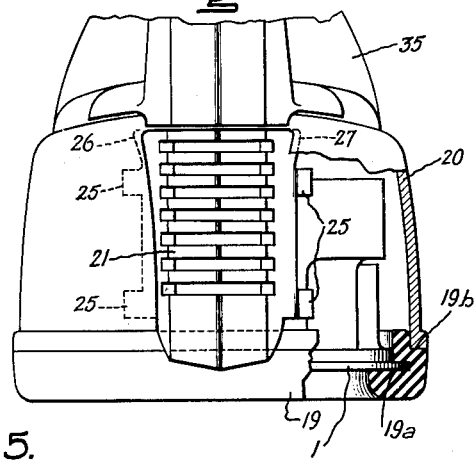
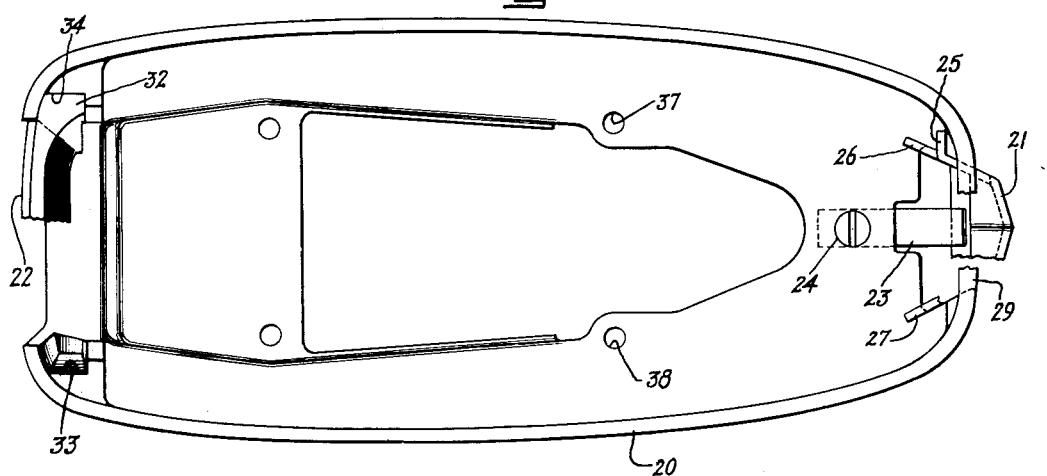
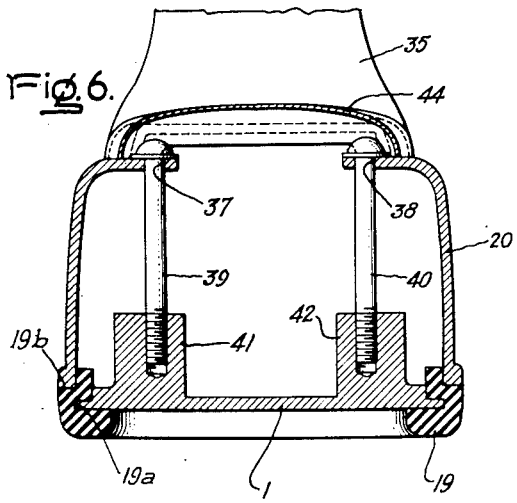
Inventor:
Carl A. Edman,
by *[signature]*
His Attorney.

Patented Oct. 28, 1952

2,615,942

UNITED STATES PATENT OFFICE 2,615,942

VENTILATION AND COOLING OF HOUSEHOLD MIXERS

Carl A. Edman, Fairfield, Conn., assignor to General Electric Company, a corporation of New York Application April 17, 1951, Serial No. 221,390

2 Claims. (Cl. 172—36)

This invention relates to improvements in electric kitchen mixers of the household type and, more particularly, to improvements in the ventilation and cooling means employed therein.

Heretofore, a serious problem arising in most kitchen mixers, and particularly in small kitchen mixers of the portable type, has been the difficulty of preventing overheating of the mixer housing or casing due to the heat liberated by the beater drive motor. Heating of the casing is, of course, undesirable in that if the casing temperature rise is great enough, considerable discomfort may be caused to the person operating the mixer. The solution to this problem has been a particularly difficult one, since in conventional mixers the motor mounting is fastened directly to the mixer casing and a large portion of the heat produced by the motor is transferred by direct conduction to the casing. In addition to this conducted heat, heat is also carried to the casing by convection and radiation.

The method of controlling the heating of any given size mixer has relied on the fact that the operating temperature of a motor of a given output tends to vary inversely as the total mass of the motor. In other words, the heavier, i. e. larger in physical size is the motor employed, the less is the heating of the mixer. The use of a larger motor, however, is not a desirable solution to the problem, since it involves additional expense, both in the purchase of a larger motor and also in the purchase of a larger casing required to house such a motor. Moreover, the larger motor and casing obviously add appreciably to the weight of the mixer. This additional weight is particularly objectionable, since most housewives ordinarily use the mixer as a portable tool, and any added weight makes it just so much more difficult for them to hold the mixer over a bowl or pan for any great length of time. Thus, although the use of a larger size motor may reduce heating of the mixer, such use results in other disadvantages which are equally as undesirable as the heating.

Another problem encountered in conventional mixers has been that of excessive noise and vibration. It has been difficult to eliminate the vibration since, as previously mentioned, in most mixers the motor has, of necessity, been secured directly to the mixer casing and, therefore, any vibrations of the motor are transferred directly to the casing through the securing members. This tends to cause rattling of the casing and increase the overall noise produced by the mixer.

To obviate the above-mentioned problems, it is a primary object of this invention to provide a new and improved structure for electric kitchen mixers.

A further object of this invention is to provide new and improved means for ventilating and cooling the beater drive motors of electric kitchen mixers.

Another object of this invention is to provide an improved electric kitchen mixer in which noise and vibration are reduced to a low level.

This invention also has as an object the provision of an electric kitchen mixer in which there is little heat transfer between the beater drive motor and the mixer casing.

In accomplishment of the foregoing objectives, a feature of this invention consists of providing a mixer structure in which the motor base plate and the mixer casing are mounted separately on a support member formed of heat insulating material, such as rubber. This mounting reduces conduction of heat to the casing, as well as providing vibration insulation between the casing and the motor. To further reduce heating of the casing, ventilating slots are provided in opposite walls thereof and the casing is shaped to form an air passageway between these slotted walls. The mixer drive motor is mounted on its base plate athwart the air passageway, so that air, in passing through the mixer, flows over and around the motor. In order to increase the air flow through the passageway over that which would flow due to normal convection currents, air impelling means such as a fan, driven by the motor, may be mounted in the passageway. This cooling air flow, together with the new and improved heat insulating mounting means, allows the use of a lighter, i. e. smaller, motor in a mixer of given output, and thereby permits the construction of a smaller and lighter mixer than heretofore has been available.

The features of this invention which are believed to be novel are set forth with particularity in the appended claims. The invention itself, however, both as to organization and mode of operation, together with further objects and advantages thereof, may best be understood by reference to the following description, to be taken in conjunction with the accompanying drawing, in which Fig. 1 is a side elevation of a mixer embodying this invention, with portions thereof shown in section; Fig. 2 is a view, partially in section, of a portion of the base of the mixer shown in Fig. 1; Figs. 3 and 4 are respectively partial rear and front elevations of the mixer, with portions thereof shown in section; Fig. 5 is a bottom view of the mixer casing or shell; and Fig. 6 is a cross-sectional view of the mixer housing taken on the line 6—6 of Fig. 1.

Referring to the drawing, the invention is shown as embodied in a portable electric kitchen mixer having a base member or plate 1 on which is mounted the frame of a beater drive motor 2. The shaft 2a of motor 2 is likewise mounted on base plate 1, being rotatably supported in bearing members 3 and 4. Positioned on one end of shaft 2 is an air impeller or fan 5, while mounted on the other end is a worm gear 6 which cooperates with worm wheels 7 to drive the beater drive shafts 8. The worm and wheels are enclosed in a gear casing 9 which is formed integrally with base plate 1 and is preferably packed with grease to lubricate the gear surfaces.

As is shown in Fig. 2, beater drive shafts 8 extend through a detachable portion of the base plate, i. e., base cover plate 10. The base cover plate is secured to base plate 1 by screws 11 and is employed to contain the packing material 12 placed between beater shafts 8 and the lower ends of gear casing 9. Packing material 12 is, of course, needed to retain the lubricating material within the gear casing so that it does not drip down onto the foodstuffs being mixed. Besides the holes needed for beater shafts 8 and screws 11, cover plate 10 also is provided with a recess 13 shaped basically in the form of keyhole. Recess 13 is provided so that the mixer may be hung from any suitable nail or hook when not in use.

Attached by any suitable means to the ends of beater shafts 8 extending through cover plate 10 are standard beater elements 14. Adjacent to the point of attachment to the beater shafts, each beater 14 is provided with a batter guard 15, as is well-known in the art. Batter guards 15 are added to prevent, as far as possible, any foodstuffs from working up the shafts of the beater elements into the moving parts of the mixer.

The power to run motor 2 and thus drive beater elements 14 is supplied through the insulated power supply conductors 16 and 16a. A multi-position switch 17, having a switch-operating knob 17a, forms a part of the motor power supply circuit within the mixer and is used to control the speed of operation of the motor. For this purpose, switch 17 may have an "off" position and one or more "on" positions. It is secured to the mixer framework through a screw 18 which extends into a tapped recess in the upper portion of gear casing 9. Thus, the entire moving system of the mixer, as well as the switch means for controlling the movement of the system, are all positioned essentially on the single base plate 1. In other words, no part of the moving system is mounted on any other member of the mixer housing, and it is thereby possible to insulate the moving system from the mixer housing.

A heat insulating support member or grommet 19, formed of a suitable flexible material, preferably soft rubber or of Vinylite plastic, is employed for that purpose. Grommet 19 extends around base plate 1, including the detachable portion comprising base cover plate 10, and is firmly secured to it. The securing means comprises an internal groove 19a in the grommet, into which the edge portions of base plate 1 are fitted. The grommet is slightly stretched in assembly to allow the edges of the base plate to be inserted into the groove and then is allowed to contract to hold the base plate firmly in place. Support member or grommet 19 projects below and well under the edge of base plate 1 whereby it functions as a supporting ring for the mixer when the beaters are not attached to it. This enables the mixer to be set down on a table or other flat surface; and since only the member 19 which is formed of rubber or similar material engages such surface, there is no danger of scratching or otherwise marring it.

The remainder of the outer housing of the mixer is also mounted on support member or grommet 19, but separately from base plate 1 so that, as hereinbefore mentioned, the grommet forms a heat insulating barrier between the base plate and the remainder of the housing. Thus, mounted directly on a shoulder 19b formed in the upper surface of the grommet is an enclosing casing or shell which defines the side and end walls of the mixer housing. This casing includes a main casing member 20 and a pair of detachable slotted or grille members 21 and 22, grille member 21 forming a portion of the front end wall of the casing and grille member 22 forming a portion of the rear end wall of the casing.

The means employed to secure grille member 21 in place are illustrated in Figs. 1, 4, and 5. A support preventing downward movement of the grille is supplied by a spring clip 23, which is secured to the roof of casing member 20 by a screw 24. Spring clip 23 engages the upper portion of grille 21 and tends to move it upwardly and outwardly. However, outward movement of the grille is prevented by a plurality of sidewardly extending ears formed integrally therewith, such as ears 25, which engage the inner surface of member 20; and upward movement is prevented by the grille projections 26 and 27 contacting the roof of the casing. Spring clip 23, of course, also prevents inward movement of the upper portion of the grille, and any inward movement of the lower portion of the grille is prevented by the contact between a downwardly extending portion 28 of the grille and the outer surfaces of grommet 19 and strut 29. Strut 29 is an integral part of the main casing member 20 and serves to keep the front portions of the side walls thereof from moving apart, i. e., "toeing out." Thus, spring clip 23, ears 25, projections 26 and 27, and downwardly extending portion 28 cooperate with the main casing member 20 and grommet 19 to hold grille 21 firmly in place.

The manner in which grille member 22 is integrated into casing 20 is illustrated in Figs. 1, 3, and 5. The grille member 22 has a lower edge portion 30 which rests on shoulder 19b of the grommet to supply a bottom support, and it is provided with sidewardly extending flanges 31 and 32 to supply the support necessary to prevent inward or outward movement. Flanges 31 and 32 fit respectively into grooves 33 and 34 provided in the main casing member 20 for that purpose. The roof of the main portion of the casing fits over grille 22 to prevent any movement of the grille in grooves 33 and 34.

Mounted on top of the casing is a handle 35 which may be used to hold and transport the mixer for use as a portable power tool. The handle 35 is joined to casing member 20 by screw 24 adjacent the front end of the mixer and by screws 36 adjacent to the rear end of the mixer. In order to accommodate these screws, holes are provided in the roof of casing member 20 and tapped recesses are provided in the handle portions immediately over these holes.

Besides the holes which are used to accommodate screws 24 and 36, the roof of casing 20 also contains a pair of holes 37 and 38 for use in joining together the mixer casing and base plate. More specifically, casing member 20 is bolted to base plate 1 by the bolts 39 and 40, as is shown in Fig. 6. Bolts 39 and 40 extend respectively through holes 37 and 38 into tapped recesses drilled in the mounting blocks 41 and 42 which are formed as an integral part of base plate 1. To allow these bolts 39 and 40 to be inserted, as well as to permit the making of minor adjustments after the mixer has been assembled, an aperture 43 is provided in the base portion of handle 35. For convenience, aperture 43 is made long enough so that the shaft for switch knob 17a may be brought out of the mixer housing through it. Once the mixer has been fully assembled and adjusted, a cover plate 44 is placed over the aperture, except for the portion occupied by the shaft of the switch knob, and is secured thereon by any suitable means.

To assemble the mixer from its component parts, the preferred method is to first assemble the entire moving system including the motor, air impeller, beater drive shaft, etc. on the base plate. Concurrently, the remainder of the housing including the casing with its grille members and the handle is fitted together. Next, the base plate is inserted in the grommet and then the remainder of the housing is mounted thereon. Finally, the bolts joining the casing and the base plate are inserted and the cover plate put on.

Thus, there is formed a mixer structure in which the motor and the rest of the moving system are heat- and vibration-insulated from the remainder of the mixer housing by means of an insulating support member. Although in the embodiment illustrated, some direct contact is provided between the base plate and the housing through bolts 39 and 40, it is obvious that by using side casings and insulating support members of sufficient strength and securing them together with cement or glue, such direct contact could be completely eliminated. Such a construction, however, would be more difficult to assemble than the illustrated embodiment.

The insulating support member is not the only means embodied in the new and improved mixer structure of this invention to prevent heating of the casing and the handle. An improved means for inducing a flow of cooling air through the mixer is also included in this structure. Grille members 21 and 22 each comprise air ports through which cooling air may be admitted to or ejected from the inside of the casing and casing member 20 is so shaped that its interior surface forms a passageway between the grille members. This passageway, defined by casing member 20, extends through fan 5 and over and around motor 2. Thus, as indicated by arrows 45, cooling air is drawn in through the air ports or grille 22 by fan 5, passed over and around motor 2, past gear casing 9 and switch 17, and ejected through the air ports of grille 21. An especially important feature of this air passageway defined by the interior surfaces of the casing and the exterior surfaces of the motor is that a considerable portion of the air is passed between the motor and the handle. This tends to greatly diminish the heating of the handle which has been an objectionable feature in conventional mixers.

Moreover, the air flow past the motor aids in another manner in keeping the entire mixer at a lower temperature, since the flow of air tends to prevent the motor itself from heating to the high temperatures previously encountered in mixers. Although in the preferred embodiment of this invention illustrated in the diagram, the slots or air ports are positioned in the end walls of the mixer, they may be placed in other portions of the mixer housing if so desired. For example, they may be placed in the side walls. Of course, to obtain the same cooling effect, the fan mounting and the shape of the air passageway would have to be altered.

Thus, while there has been described what at present is considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim as new and desire to secure by Letters Patent of the United States is:

1. In a kitchen mixer, a base plate, an electric motor mounted on the top side of the base plate which extends longitudinally thereof and is positioned entirely within the confines of the base plate, a heat insulating resilient grommet which extends around the base plate and is secured to the edge thereof, said grommet having a portion which extends to the underside of the base plate to form a resilient support for the mixer and a portion which projects above the base plate and has walls shaped to define an upwardly facing seat which surrounds the base plate, a casing positioned over the motor having side, end and top walls which house the motor and a bottom edge resting on said upwardly facing seat, means fastening the casing to said base, and a handle attached to and extending across the top wall of said casing.

2. In an electric kitchen mixer, a base plate, an electric motor mounted on the top side of the base plate which extends longitudinally thereof and is positioned entirely within the confines of the base plate, a heat insulating resilient grommet which extends around the base plate and is secured to the edge thereof, said grommet having a portion which extends to the underside of the base plate to form a resilient support for the mixer and a portion which projects above the base plate and has walls shaped to define an upwardly facing seat which surrounds the base plate, a casing positioned over the motor having side, end and top walls which house the motor and a bottom edge resting on said upwardly facing seat, said side, end and top walls being spaced from said motor to define cooling passages for flow of cooling air and being provided with air flow openings which communicate with said passages, a ventilating fan driven by the motor shaft for effecting flow of air through said openings and passages, means fastening said casing to the base, and a handle attached to and extending across the top wall of said casing, flow of air through said passages serving to minimize transfer of heat from the motor to the handle.

CARL A. EDMAN.

REFERENCES CITED

The following references are of record in the file of this patent:

UNITED STATES PATENTS

| Number | Name | Date |
| --- | --- | --- |
| 859,674 | Lindstrom | July 9, 1907 |
| 1,710,180 | Moore | Apr. 23, 1929 |
| 1,840,007 | Ames | Jan. 5, 1932 |
| 2,008,377 | Whitaker | July 16, 1935 |
| 2,203,672 | Chester | June 11, 1940 |
| 2,247,707 | Jordan | July 1, 1941 |
| 2,258,165 | Sassano | Oct. 7, 1941 |
| 2,483,727 | Frisbie | Oct. 4, 1949 |
| 2,524,628 | Jody | Oct. 3, 1950 |